United States Patent [19]

Minich et al.

[11] Patent Number: 5,517,263
[45] Date of Patent: May 14, 1996

[54] IMAGE PROJECTION SYSTEM AND METHOD OF USING SAME

[75] Inventors: Arthur P. Minich, San Diego; Leonid Shapiro, Lakeside, both of Calif.

[73] Assignee: Proxima Corporation, San Diego, Calif.

[21] Appl. No.: 279,943

[22] Filed: Jul. 25, 1994

[51] Int. Cl.$^6$ .................................................. G03B 21/28
[52] U.S. Cl. ................................ 353/31; 348/771; 353/37
[58] Field of Search ................................ 353/31, 33, 37; 359/48, 72.75; 348/744, 766, 771, 790, 770

[56] References Cited

U.S. PATENT DOCUMENTS

| | | | |
|---|---|---|---|
| 3,713,721 | 1/1973 | Watson | 348/769 |
| 4,734,558 | 3/1988 | Nakano et al. | 359/72 |
| 5,079,544 | 1/1992 | DeMond et al. | 340/701 |
| 5,170,156 | 12/1992 | DeMond et al. | 340/794 |
| 5,192,946 | 3/1993 | Thompson et al. | 340/794 |
| 5,206,674 | 4/1993 | Puech et al. | 359/48 |
| 5,214,420 | 5/1993 | Thompson et al. | 340/795 |
| 5,231,432 | 7/1993 | Glenn | 353/31 |
| 5,255,082 | 10/1993 | Tamada | 353/31 |
| 5,260,728 | 11/1993 | Yoshioka et al. | 353/34 |
| 5,260,815 | 11/1993 | Takizawa | 353/31 |
| 5,272,473 | 12/1993 | Thompson et al. | 345/7 |
| 5,287,096 | 2/1994 | Thompson et al. | 345/147 |
| 5,300,942 | 4/1994 | Dolgoff | 345/32 |
| 5,303,043 | 4/1994 | Glenn | 348/40 |
| 5,317,348 | 5/1994 | Kuize | 353/31 |
| 5,374,968 | 12/1994 | Haven et al. | 353/31 |
| 5,379,135 | 1/1955 | Nakagaki et al. | 359/41 |

*Primary Examiner*—William C. Dowling
*Attorney, Agent, or Firm*—Bernard L. Kleinke; Jerry R. Potts; Peter P. Scott

[57] ABSTRACT

An image projection system includes a bright light source of polarized light, and in one form of the invention, a spatial light modulator, having an alignment layer, to modulate the polarized projection light, wherein the bright polarized light source is aligned with the alignment layer to permit the polarized light to pass therethrough without the need for unwanted light blocking polarizers. The spatial light modulator generates output light representative of the image, which is projected by a projection lens system onto a remote viewing surface to form a bright image thereon. In another form of the invention, three different colored images are each produced by three separate polarized light sources illuminating three individual light valves, and are superimposed to produce a full color image while all three light sources are maintained fully activated to provide a brightly illuminated image.

20 Claims, 6 Drawing Sheets

IMAGE PROJECTION SYSTEM AND METHOD OF USING SAME

This application is related to U.S. patent applications 08/123,133, filed Sep. 17, 1993, now U.S. Pat. No. 5,483, 382, and 08/122 697, filed Sep. 17 1993, now, U.S. Pat. No. 5,400,095, and 08/059,550, filed May 11, 1993, now U.S. Pat. No. 5,321,450, and 08/243,062, filed May 12, 1994, now U.S. Pat. No. 5,453,803; wherein the forgoing patents are hereby incorporated by references as if fully set forth herein.

TECHNICAL FIELD

The present invention relates in general to an improved image projection system and method of using it. The invention more particularly relates to an image projection system which may be used to project a bright image in an efficient and relatively low cost manner, and which can be incorporated in a compact size projector used to project video images and the like.

BACKGROUND ART

There have been many examples of projection systems for displaying images including video images. For example, such projection systems, and components thereof, are described in U.S. Pat. Nos. 5,313,321; 5,307,186; 5,303,403; 5,300,942; 5,260,815; 5,245,453; 5,231,432; 5,189,534; 5,085,506; 5,085,498; 5,032,924; 5,012,274; 4,994,901; 4,969,734; 4,848,879; 4,818,098; 4,751,509; and 4,675,702, which are each incorporated herein by reference.

Generally, such projection systems disclosed in the foregoing patents, include liquid crystal display (LCD) panels for producing color images. The colored light for forming the color images can be generated by using color filters to separate the desired colors from a white light source, such as an incandescent light source. Alternatively, the desired colors can be obtained from a white light source by passing the white light through a series of dichroic devices such as dichroic mirrors, thereby eliminating unwanted light. The filtered colored light is then modulated by LCD panels.

The use of devices such as color filters and mirrors results in the loss of light intensity. Thus, the overall efficiency of the system, where efficiency is measured as lumens per watt, is impaired.

Additionally, the LCD panels inherently cause light to be lost. In this regard, an LCD panel includes an alignment layer, which cooperates with the liquid crystal layer for permitting polarized light to enter the liquid crystal layer. Therefore, polarizers are used with the LCD panels to polarize the light entering the alignment layers. Such polarizers necessarily block all light except the desired polarized component. Thus, even more light is lost due to the polarizers, thereby reducing the overall brightness of the final image emitted from the panel.

In addition to the light lost due to the use of filters and polarizers, the aperture ratio of the LCD panels can further contribute to the amount of light lost in the system. Thus, due to such light loss factors, only a small fraction of the initial amount of light provided by the light source is utilized in the formulation of the output image.

While such image projection systems may adequately project full color images in low ambient light conditions, they do not always perform satisfactorily in high ambient light conditions for some applications. In this regard, due to the lower intensity of the resulting image, it must, by necessity, be viewed in a darkened room. This is not always an acceptable viewing condition. As image projection systems are often used in conjunction with other activities which require bright ambient light, such as note taking, it is desirable to have an image projection system, which is capable of producing a bright image, even in bright ambient light conditions.

In an attempt to provide a bright full color image, projection systems have employed laser illumination as described in U.S. Pat. Nos. 5,287,096; 5,272,473; 5,214,420; 5,214,419; 5,206,629; 5,192,946; 5,170,156; 5,162,787; 5,128,660; and 5,079,544, which are incorporated herein by reference. In the foregoing laser illumination patents, an image projection system includes three discrete colored lasers, one red, one green, and one blue. The colored lights emanating from the lasers are combined to form a white light, which, in turn, is directed onto a single spatial light modulator to produce a full color image.

However, in order to achieve full color image projection, the three lasers of the aforementioned patents are activated sequentially to produce alternatingly three colored images. For example, the red laser is first activated and deactivated, and then the green laser is activated and deactivated. Finally, the blue laser is activated and deactivated before repeating the cycle. The total activation and deactivation cycle time for the three lasers is set to be less than the critical flicker frequency of the human eye. In this manner, a red, a green, and a blue image will appear to coalesce into a single full color image in the eye of the viewer.

Alternatively, a full color image can be produced by sequencing combinations of the three lasers simultaneously. For each pixel, the proportions of the contribution of each laser would be adjusted to produce a desired color resulting from the light emitted by the combination of lasers. For example, all three lasers could be activated momentarily simultaneously to emit a specific amount of colored light to achieve the overall desired color for a given pixel. The lasers are then extinguished, and then activated selectively to emit another color combination for the next pixel. In this manner, all of the pixels requiring different colors are illuminated sequentially. To the human eye, it would appear that all of the different colored pixels have combined to form a single full color image.

While the patented laser projection systems may be capable of producing relatively bright full color projection images, they require that the lasers be interrupted sequentially in order to produce various colored images. As a result of the interruption of the lasers, the amount of light produced by each laser is diminished or even not activated at all, during the modulation procedure. Thus, the resulting colored image does not fully utilize the intensity of the lasers for illumination purposes at any one time.

For example, where the lasers are alternately activated and deactivated in repeating sequences (e.g., red, green, blue, red, green, blue, etc.), each laser may only be activated for one third of one cycle. As a result, each laser produces only a fraction of the amount of light that it is potentially capable of producing at that given instant of time, and the other two lasers are totally extinguished. The resulting full color image projected by the patented projection system is produced in an inefficient manner for a relatively low energy cost per lumen of output. Only a fraction of the laser light is utilized during the modulation procedure.

In short, it would be highly desirable to have a new and improved projection system which can generate a bright image in a highly efficient manner for a relatively low energy cost per lumen of output. In this regard, for a given size light source, an extremely bright image should be created, and yet the overall size of the projector should be small and compact. Thus, the projection system should be highly efficient, and relatively inexpensive to manufacture.

Therefore, it would be highly desirable to have a new and improved image projection system which can produce a bright image, even a full color image. Such an image projection system should operate in a highly efficient manner and should be relatively inexpensive to manufacture.

DISCLOSURE OF INVENTION

Therefore, the principal object of the present invention is to provide a new and improved image projection system, and a method of using it, to produce bright display images in a highly efficient manner.

Another object of the present invention is to provide such a new and improved image projection system which is compact in size, and which is relatively inexpensive to manufacture.

Briefly, the above and further objects of the present invention are realized by providing a new and improved image projection system which can produce bright images according to a novel image illumination method and apparatus of the present invention.

An image projection system includes a bright light source of polarized light, and in one form of the invention, a spatial light modulator, having an alignment layer, to modulate the polarized projection light, wherein the bright polarized light source is aligned with the alignment layer to permit the polarized light to pass therethrough without the need for unwanted light blocking polarizers. The spatial light modulator generates output light representative of the image, which is projected by a projection lens system onto a remote viewing surface to form a bright image thereon. In another form of the invention, three different colored images are each produced by three separate polarized light sources illuminating three individual light valves, and are superimposed to produce a full color image while all three light sources are maintained fully activated to provide a brightly illuminated image.

The bright image can be formed in an efficient manner utilizing a relatively compact system according to the novel method and apparatus of the present invention.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein.

BEST MODE FOR CARRYING OUT THE INVENTION

Figure 1:
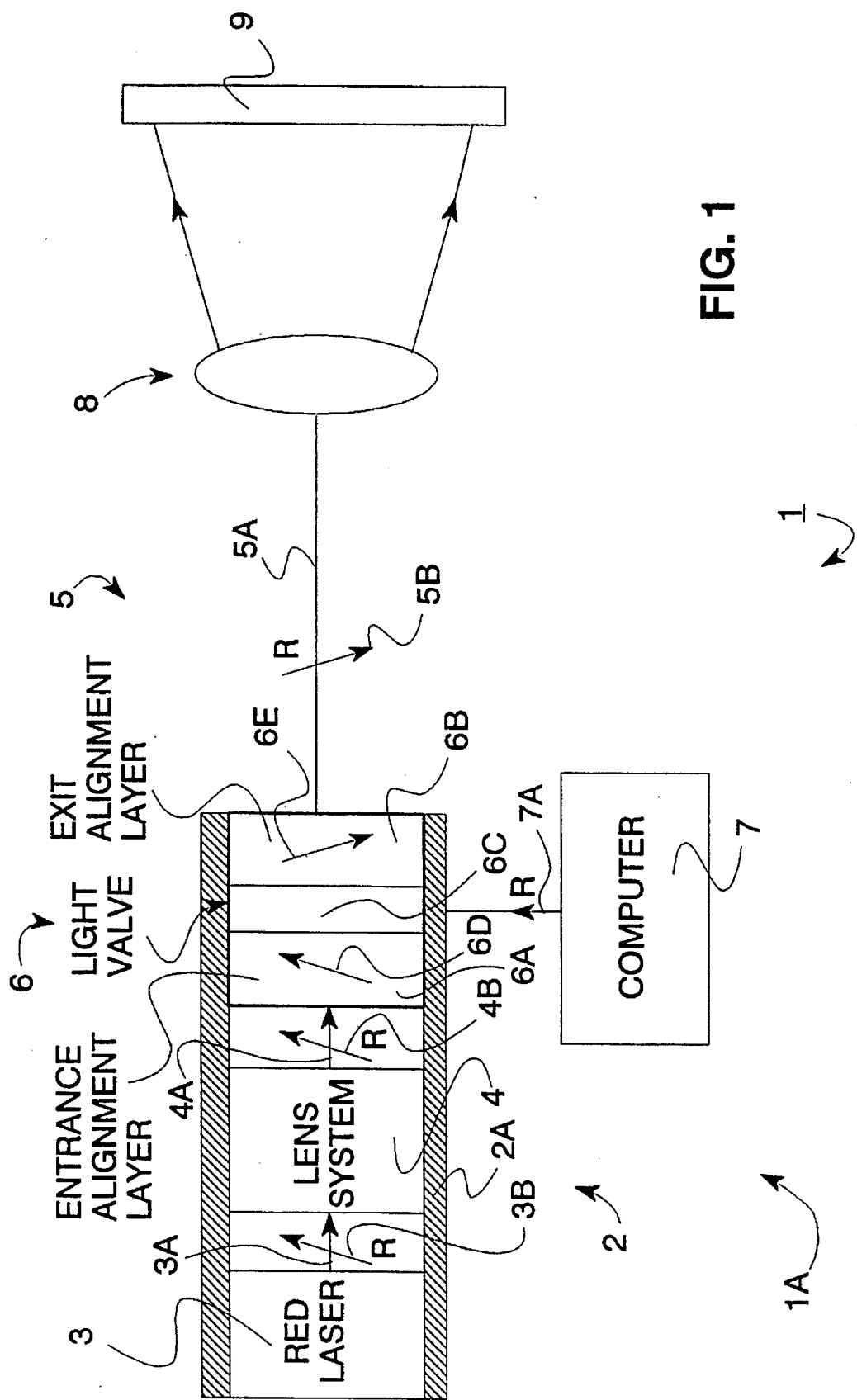
FIG. 1 is a symbolic block diagram of an image projection system, which is constructed in accordance with the present invention.

Referring now to FIG. 1 of the drawings, there is shown an image projection system 1 which is constructed according to the present invention. The projection system 1 is relatively compact in size and produces a bright projected image in a highly efficient manner.

Image projection system 1 includes a projection apparatus generally indicated at 1A having a projection light source generally indicated at 2 for producing a polarized projection light beam 4A by means of a source of polarized light in the form of a laser 3 having a lens system 4, a spatial light modulator 5 in the form of a light valve 6 disposed within the optical path of the polarized projection light beam 4A modulates it for generating an output light beam 5A representative of the image to be projected. The light valve 6 is optically coordinated with the polarized projection light beam 4A to permit the light beam 4A to be directed toward the light valve 5 substantially unimpeded. A projection lens system 8 disposed within the optical path of the output light beam 5A projects an enlarged image onto a remote viewing surface 9, wherein the image is formed thereon.

In operation, the projection light source or red laser 2 is activated to produce polarized projection light beam 4A. To ensure that substantially all of polarized light beam 4A enters the light valve 6, the laser 3 is aligned optically with the light valve 6 so that the axis of polarization of projection light beam 4A is optically aligned with a corresponding polarization axis of the light valve 6. The light valve 6 then modulates the projection light beam 4A, generating output light beam 5A. Projection lens system 8 projects output light beam 5A onto the remote viewing surface 9, thereby forming a bright image thereon.

The use of a monochromatic laser such as the red laser 3, together with its proper alignment with the light valve 6, enables substantially all of the laser light beam 3A to be utilized to form the projected image.

Figure 7:
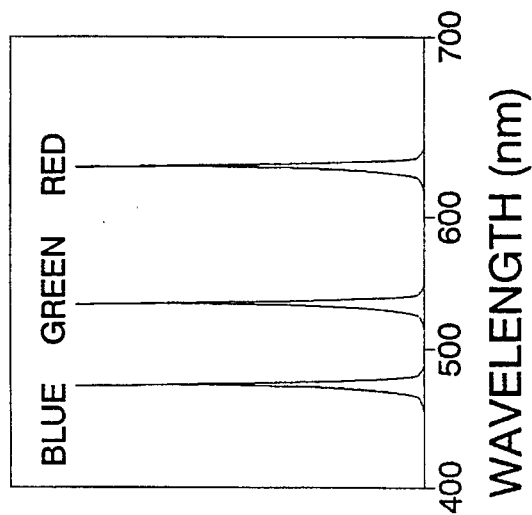
FIG. 7 is a graph illustrating the relative radiation spectra for blue, green, and red laser light beams.

As seen in FIG. 7, the light energy for monochromatic lasers such as blue, green, and red lasers is relatively intense over a relatively small range of wavelengths. The curves, BLUE, GREEN, and RED of FIG. 7 indicate that color filtering is not required due to the narrow range of wavelengths, and thus without the use of filters and/or polarizers with the light valve 6, substantially the full intensity of the laser optical output is utilizable. Furthermore, the light emanating from a laser is polarized, and thus, there is no need for polarizing filters, which would otherwise reduce the laser light energy in the system 1. As a result, substantially all of the laser light energy is available to project an image, making lasers an efficient source of light for the system 1 of the present invention.

Figure 6:
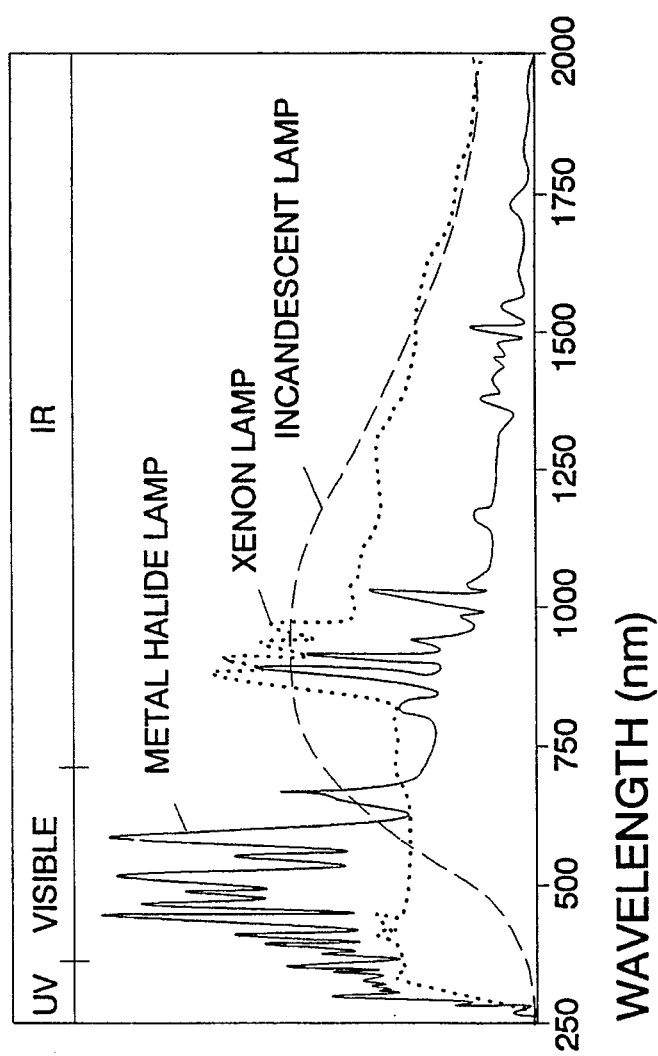
FIG. 6 is a graph illustrating the relative radiance intensity of various white light sources, including a metal halide lamp, a xenon lamp, and an incandescent lamp, as a function of wavelength.

The use of the laser 3 of the inventive system 1 according to the method of the present invention, is a highly efficient and effective projection system, as compared to conventional systems which utilize incandescent lamps, metal halide lamps or xenon lamps. As indicated in FIG. 6, a conventional incandescent lamp (not shown) produces only a small amount of light energy in the visible light range, between about 350 nanometers (nm) and 700 nm. Most of the light energy from an incandescent lamp is in the infra-red region, where it is not entirely useful for projection purposes. In addition, due to the relatively low intensity level in the visible region, the image projected with an incandescent lamp is relatively dark and may be undesirable for some applications. Thus, prior projection systems had to be used in areas where the ambient light was relatively low. Otherwise, the projected image could not be easily seen.

As shown in FIG. 6, by comparison to an incandescent lamp, the relative intensity of a conventional projection metal halide lamp (not shown) is quite high. However, it can be seen from FIG. 6 that the radiation spectra of a metal halide lamp spans from about 250 nm to about 2,000 nm. Thus, a large portion of light emanating from the metal halide lamp is not useful as visible light for projecting a full color image. Thus, only a portion of the light output is utilizable for a given amount of electrical input power. Moreover, the useful light output is even decreased when filters and polarizers are required. Additionally, the energy requirements of a metal halide lamp are quite high.

Similarly, using a conventional xenon lamp instead of a metal halide lamp results in a conventional image projection system (not shown) having a relatively moderate efficiency at best.

In addition to loss of light energy due to the use of color filters and polarizers, prior image projection systems wasted light energy by requiring polarization of non-polarized light. Thus, even more light is necessarily optically filtered in order to cooperate properly with an associated LCD alignment layer, further reducing the lumen output of the projection system, resulting in a lower efficiency.

The use of the laser 3 of the image projection system 1 greatly enhances the amount of light energy which is actually used to project an image in a highly efficient manner. In addition, lasers have a relatively low energy requirement.

Considering now the projection light source 2 in greater detail, the projection light source 2 includes a housing 2A to facilitate the proper alignment of polarized projection light beam 4A. The laser 3 is mounted rotatably adjustably within the housing 2A for emitting a red polarized laser beam 3A. The laser beam 3A has an axis of polarization, such as a direction of polarization as indicated by arrow 3B. Furthermore, while laser 3 is shown and described as a red laser herein, other colored lasers, e.g., blue or green lasers, may also be used instead of the red laser 3.

The lens system 4 is mounted within housing 2A and is disposed within the laser beam 3A to focus the laser beam 3A onto the light valve 6. An example of a lens system is shown and described in U.S. Pat. No. 5,192,946, which is incorporated herein by reference.

Considering now the spatial light modulator 5 in greater detail, the light valve 6 is conventional, and is disposed within the optical path of the projection light beam 4A. The valve 6 is mounted within the housing 2A to align properly its polarized light with the light valve 6. A conventional computer 7 is electrically connected to the light valve 6 to control it for causing the generation of the desired image by transmitting light through the light valve 6.

The light valve 6 includes an entrance alignment layer 6A and an exit alignment layer 6B, which cooperate with a liquid crystal layer 6C interposed therebetween to guide light through the light valve 6. In this regard, the entrance alignment layer 6A and the exit alignment layer 6B, have axes of polarization represented diagrammatically by arrows 6D and 6E, respectively.

The entrance alignment layer 6A ensures that light entering the light valve 6, such as projection light beam 4A, is correctly aligned with the axis for interacting with the liquid crystal layer 6C. Thus, the output modulated light beam image 5A has a polarization, represented by arrow 5B, which is aligned with the axis of polarization of the alignment layer 6B.

The light valve 6 is a suitable spatial light modulator, such as a twisted nematic liquid crystal display (LCD), a supertwisted nematic liquid crystal display, an active matrix liquid crystal display, or any other suitable transmissive light valve or light shutter capable of modulating light under the control of the computer 7 or other image controlling apparatus, such as a video recorder (not shown) to produce an image.

In order to reduce the size of the image projection system 1, the light valve 6 is small in size, so that the overall size of the system 1 can be compact and light in weight. The size of the generally rectangular surface area of the light valve 6, normal to projection light beam 4A, is about three inches by about three inches. More preferably, the size of the surface area normal to the projection light beam 4A of the light valve 6 is about two inches by about two inches. Most preferably, the size of the surface area normal to the projection light beam 4A is about one inch by about one inch.

According to the method of the present invention, the laser 3 is rotatably aligned about its longitudinal axis until the axis of polarization of projected laser light beam 4A is substantially aligned with the axis of polarization of the entrance alignment layer 6A. Thereafter, the laser 6 and the light valve 6 are fixed by means (not shown) within the housing 2A.

From the foregoing, it will be understood by one skilled in the art that substantially all of the laser beam 3A emanating from the laser 3 is utilized to produce a bright image on the viewing surface 96. As indicated in FIG. 7, the coherent high intensity red laser light is located within a narrow band totally within the visible spectrum. Since there is no need for light blocking filters or polarizers, there is little or no loss of the light intensity.

Figure 2:
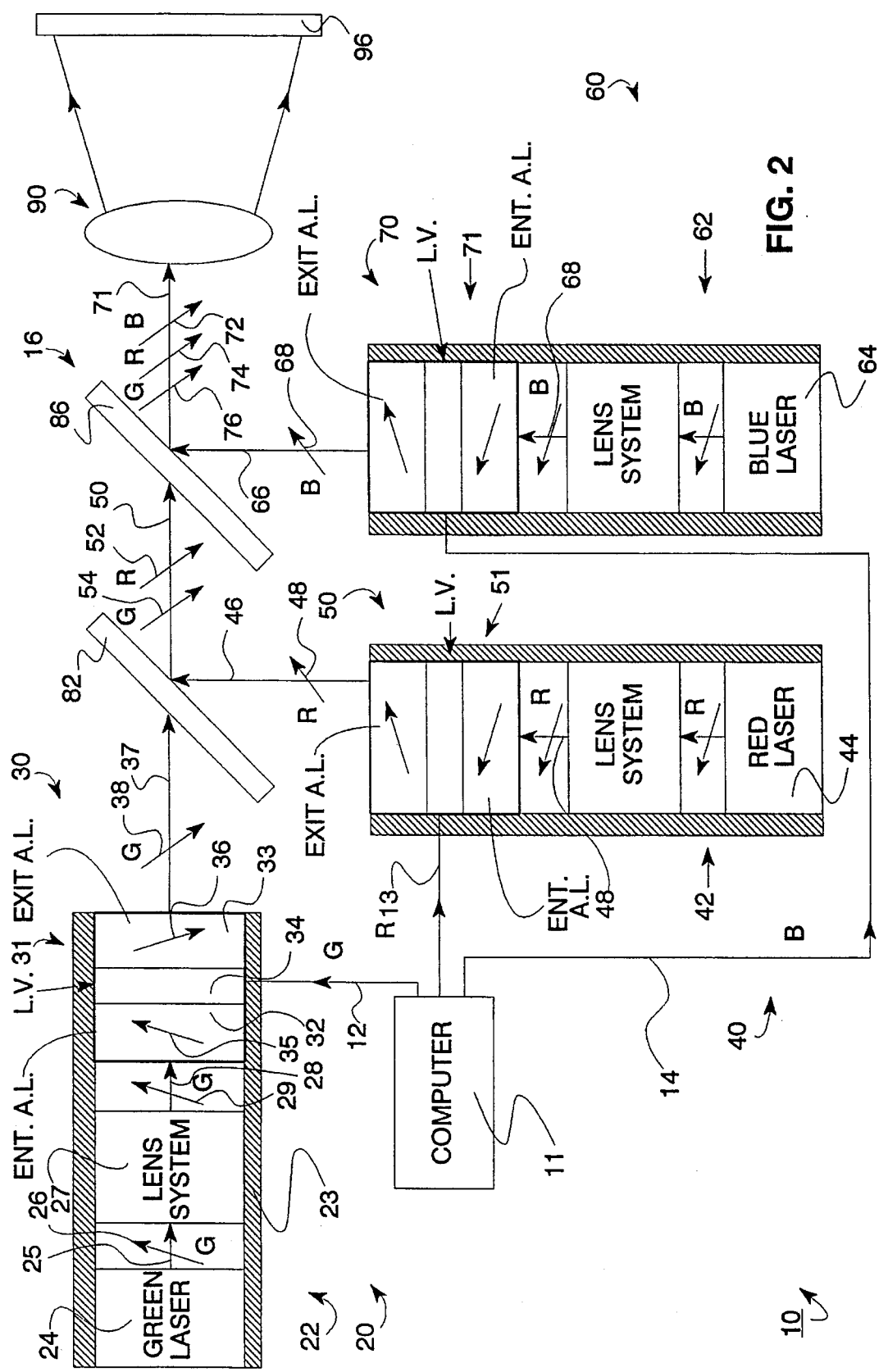
FIG. 2 is a block diagram of another image projection system, which is also constructed in accordance with the present invention.

Referring now to the drawings, and more particularly to FIG. 2 thereof, there is shown another image projection system 10, which is constructed according to the present invention. The image projection system 10 projects a bright full color image in a highly efficient manner according to the method of the present invention.

The image projection system 10 generally comprises a green projection apparatus 20, a red projection apparatus 40 and a blue projection apparatus 60 for producing output light images 37, 46, and 66, respectively, which are each representative of the image to be projected and differ only by color. The image projection system 10 further includes an optical or mirror system generally indicated at 16 for combining the three differently colored light images 37, 46, and 66 into a single full color output light image 71. A projection lens system 90 projects the full color output light image 71 onto a remotely located viewing surface 96, forming the desired enlarged full color image thereon.

Considering now the projection apparatus 20 in greater detail, the green projection apparatus 20 is substantially similar to the apparatus 40 and to the apparatus 60. Therefore, only the projection apparatus 20 will be considered hereinafter in greater detail.

The projection apparatus 20 is substantially similar to the projection apparatus 1A of FIG. 1, and differs only by the color of the image being produced. In this regard, the projection apparatus 20 includes a projection light source 22 in the form of a green laser 24 for producing a green polarized projection laser light beam 28, similar to the red projection laser light beam 4A of the projection system 1. The projection apparatus 20 further includes a spatial light modulator generally indicated at 30 disposed in the optical path of the light beam 28 for modulating it to produce the green modulated output light beam or image 37 representative of a green version of the image to be projected. The spatial light modulator 30 is optically aligned with the polarized laser light beam 28 to permit light beam 28 to be guided through the spatial light modulator 30 substantially unimpeded in a highly efficient manner as explained in connection with the system 1 of FIG. 1.

In operation, the projection light sources 22, 42, and 62 are activated, producing projection polarized laser light beams 28, 48, and 68, wherein the projection light beam 28 is green in color, the projection light beam 48 is red in color, and the projection light beam 68 is blue in color. To ensure that substantially all of the respective projection light beams 28, 48, and 68 can enter unattenuatedly their respective spatial light modulators 30, 50, and 70, the projection light sources 22, 42, and 62 are aligned about their longitudinal axes relative to the polarization axes of the respective alignment layers of the spatial light modulators 30, 50, and 70, in a manner as described in connection with the system 1 of FIG. 1. The spatial light modulators 30, 50, and 70 then modulate the respective projection light beams 28, 48, and 68, generating the output light images 37, 46, and 66. The mirror system 16 superimposes or combines the output light images 37, 46, and 66 into the single full color output light image 71.

Considering now the projection light source 22 in greater detail, projection light source 22 includes a housing 23 to facilitate the alignment of polarized projection light beam 28. A laser 24 is rotatably attached to housing 23 for emitting a green laser beam 25. The laser beam 25 has a characteristic polarization, such as S-polarization as indicated by arrow 26. It should be understood that characteristic polarization of the laser beam 25 could also be P-polarization without detracting from the operation of the image projection system 10.

The projection light source 22 further includes a lens system 27 mounted within housing 23, and disposed within the laser beam 25 to focus the cross-sectional area of the laser beam 25. The focus of laser beam 25 provides a polarized projection light beam 28 having the same polarization as laser beam 25, and is indicated by arrow 29.

Considering now the spatial light modulator 30 in greater detail, the spatial light modulator 30 is substantially similar to the spatial light modulator 5. In this regard, spatial light modulator 30 includes a light valve device 31 having an entrance alignment layer 32 and an exit alignment layer 33, on opposed faces of an intermediate liquid crystal layer 34. The alignment layers 32 and 33 have associated axes of polarization 35 and 36, respectively, to facilitate proper coordination of the projection light beam 28 with the liquid crystal layer 34. A computer 11 electronically connected to the light valve device 31 by a conductor 12 facilitates the generation of the desired image in a manner similar to the system 1. The computer 11 is also electrically connected to the light valves 51 and 71 of projection apparatus 40 and the apparatus 60, respectively. In this manner, the computer 11 is able to generate multiple images in different colors by controlling the light valve devices 31, 51, and 71 for producing the desired modulated output light beams or images 37, 46, and 66.

Considering now the mirror system 16 in greater detail, the mirror system 16 includes a pair of dichroic mirrors 82 and 86 for combining the output light beams 37, 46, and 66 into the full color output light beam 71. The dichroic mirror 82 reflects the red light modulated beam and permits the green light modulated beam to pass therethrough. The dichroic mirror 86 reflects the blue light modulated image and permits the green and red images to pass therethrough.

In this regard, the output modulated light beam or image 46 having a direction of polarization as indicated by arrow 48 is reflected by the mirror 82, while the output light beam 37 having a polarization direction as indicated by arrow 38 passes through the mirror 82, forming a green/red output light beam or superimposed image 50.

The green/red output light beam or superimposed image 50 is then combined with the output light beam or image 66, having a polarization indicated by the arrow 68, with the dichroic mirror 86 to produce the desired full color output light beam or image 71.

In use, the green laser 24 is activated to produce the light beam 28. Similarly, the lasers 44 and 64 of the projection light sources 42 and 62 are activated to produce the projection light beams 48 and 68, respectively. The lasers 24, 44, and 64 are each then rotatably aligned about their respective longitudinal axes, wherein substantially all of the projection light beams 28, 48, and 68 enter light valves 31, 51, and 71 respectively unimpededly.

The computer 11 facilitates the modulations of the projection light beams 28, 48, and 68 to generate the colored output light beams or images 37, 46, and 66. The colored output light beams or images 37, 46, and 66 are combined or superimposed by the dichroic mirrors 82 and 86 to form the full color output light beam 71.

The output intensities of each one of the lasers 24, 44, and 64 are individually adjusted so that when combined, the output of each of the lasers 24, 44, and 64 is in proportion to the amount of the respective color found in white light. In this regard, the percentage of color from each colored laser, in proportion to the entire combination, is as follows: About sixty percent green, about thirty-two percent red, and about eight percent blue.

Figure 3:
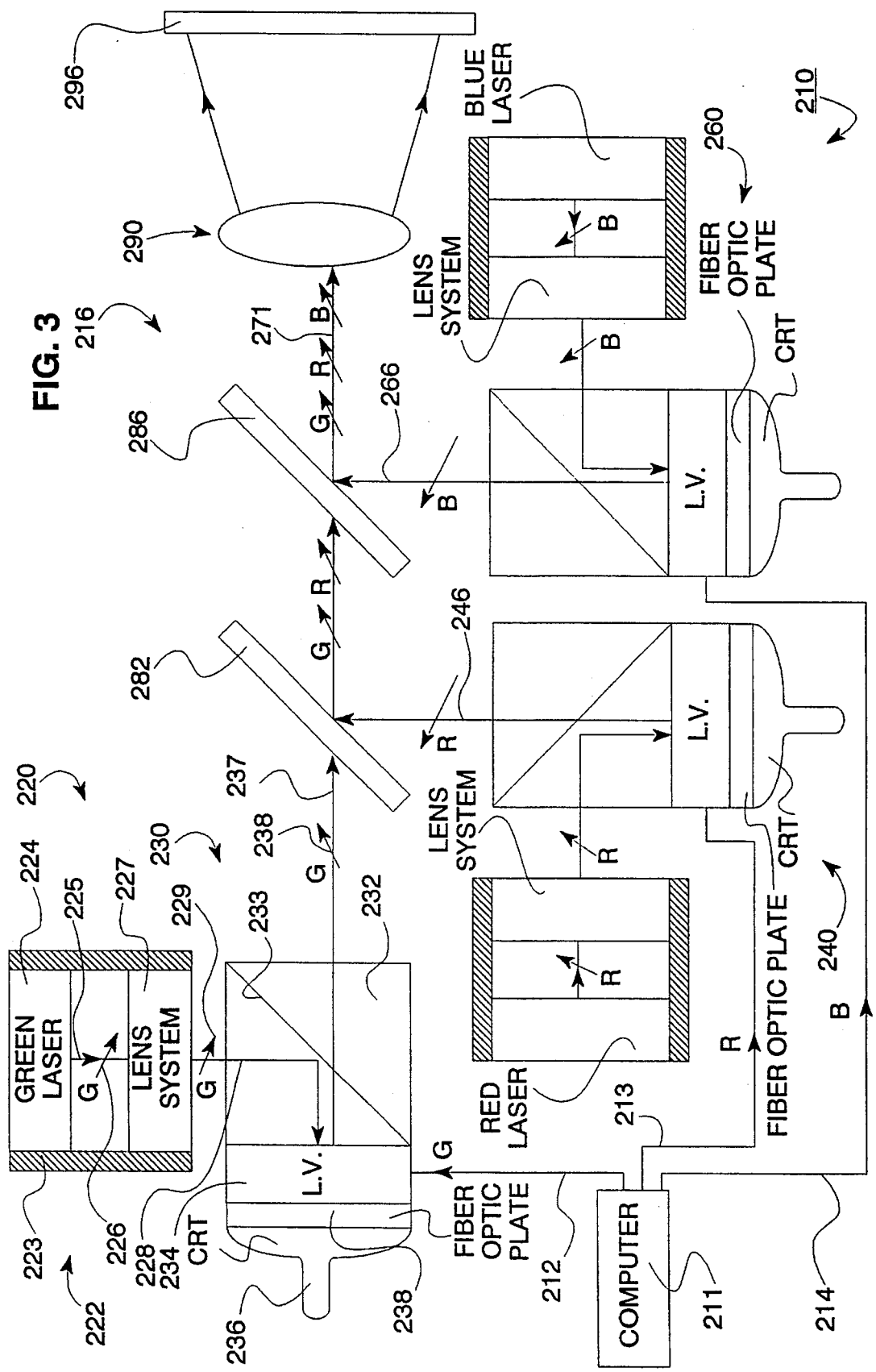
FIG. 3 is a block diagram of still another image projection system, which is also constructed in accordance with the present invention.

Referring now to FIG. 3 of the drawings, there is shown another image projection system 210 which is also constructed according to the present invention. The image projection system 210, and the method of using it, is similar to the image projection system 10, and includes a green projection apparatus 220, a red apparatus 240, and a blue apparatus 260 for producing green, red and blue output light beams or images 237, 246, and 266, respectively. The image projection system 210 further includes a mirror system 216 to combine the output light beams 237, 246, and 266 into a full color output light beam 271 in a similar manner as the mirror system 16 of FIG. 2, and a projection lens system 290 to project the full color output light beam or image 271 onto a remotely located viewing surface 296, thereby producing a full color image thereon.

Considering now the projection apparatus 220 in greater detail, only the projection apparatus 220 will be considered hereinafter as the projection apparatus 240 and the apparatus 260 are substantially similar to one another as well as to the system 1 of FIG. 1, except that the apparatus 220 operates reflectively rather than transmissively.

The projection apparatus 220 includes a projection light source 222 for producing a polarized projection light beam 228, and a spatial light modulator 230 for modulating the projection light beam 228 and generating an output light beam 237 representative of the image to be projected.

Considering now the projection light source 222 in greater detail, the projection light source 222 is substantially similar to the projection light source 22. In this regard, the projection light source 222 includes a laser 224 rotatably mounted in housing 223 for producing a polarized laser beam 225. A lens system 227 focuses the laser beam 225 to produce the projection light beam 228, wherein the projection light beam 228 and the laser beam 225 have similar polarization directions as indicated by arrows 226 and 229, respectively.

Considering now the spatial light modulator 230 in greater detail, the spatial light modulator 230 includes a polarizing beam splitter 232 to redirect the projection light beam 228 onto the light valve 234. Although a polarizing beam splitter, such as polarizing beam splitter 232, is preferred, other optical devices, including dichroic mirrors may also be used. The light valve device 234 modulates the projection light beam 228 to generate the output light beam 237, having a polarization direction which is reflected ninety degrees from the direction of the projection light beam 228, as indicated by the arrow 238. A computer 211 is electrically connected to the light valve device 234 by conductor 212 and controls the light valve 234.

The light valve 234 is a beam addressed light valve which utilizes photoelectric liquid crystal technology. In this regard, the formation of the image within the light valve device 234 is facilitated by a writing light, and the image is converted into an output image by a reading light. An example of such a beam addressed light valve is described in SID '90 Digest, Paper No. 17A.2, "Video-Rate Liquid-Crystal Light-Valve Using an Amorphous Silicon Photoconductor," by R. D. Sterling, R. D. Te Kolste, J. M. Haggerty, T. C. Borah, and W. P. Bleha, which is incorporated herein by reference.

In this regard, the projection light beam 228 functions as a reading light. In order to form the image in the light valve device 234 which will be "read" by the projection light beam 228, the light valve device 234 further includes a writing light device, such as cathode ray tube (CRT) 236, for "writing" the desired image to the light valve device 234, and a fiber optic plate 238 for transferring directly the "writing" image from the CRT 336 to the light valve device 234.

In operation, the laser 224 is activated to produce the projection light beam 228 having an initial polarization, such as S-polarization, as indicated by the arrow 229. The projection light beam 228 enters the polarizing beam splitter 232 and is reflected by the reflective surface 233 toward the light valve 234. As the projection light beam 228 strikes the light valve 234, the projection light beam 228 acts as a "reading" light and is modulated accordingly.

After being modulated, the projection light beam 234 reflects from the light valve 234 as output light beam 237, which is representative of the image formed by the "writing" light on the light valve device 234. The output light beam 237 then passes through the reflective surface 233 of the polarizing beam splitter 232 and out of the projection apparatus 220.

The "writing" light is supplied by the CRT 236 and is transmitted through the fiber optic plate 238 to the light valve device 234. The Computer 211 cooperates with the CRT 236 to modulate the light valve device 234, thereby modulating the projection light beam 228 to produce the desired image.

Similarly, the projection apparatus 240 and the apparatus 260 generate the respective output light beams 246 and 266. The dichroic mirrors 282 and 286 of the mirror system 216 combine or superimpose output light beams 237, 246, and 266 into a full color output light beam 271. The full color output light beam 271 is then projected onto the remote surface 296 by the projection lens system 286, forming the bright full color image on the surface 296.

Figure 4:
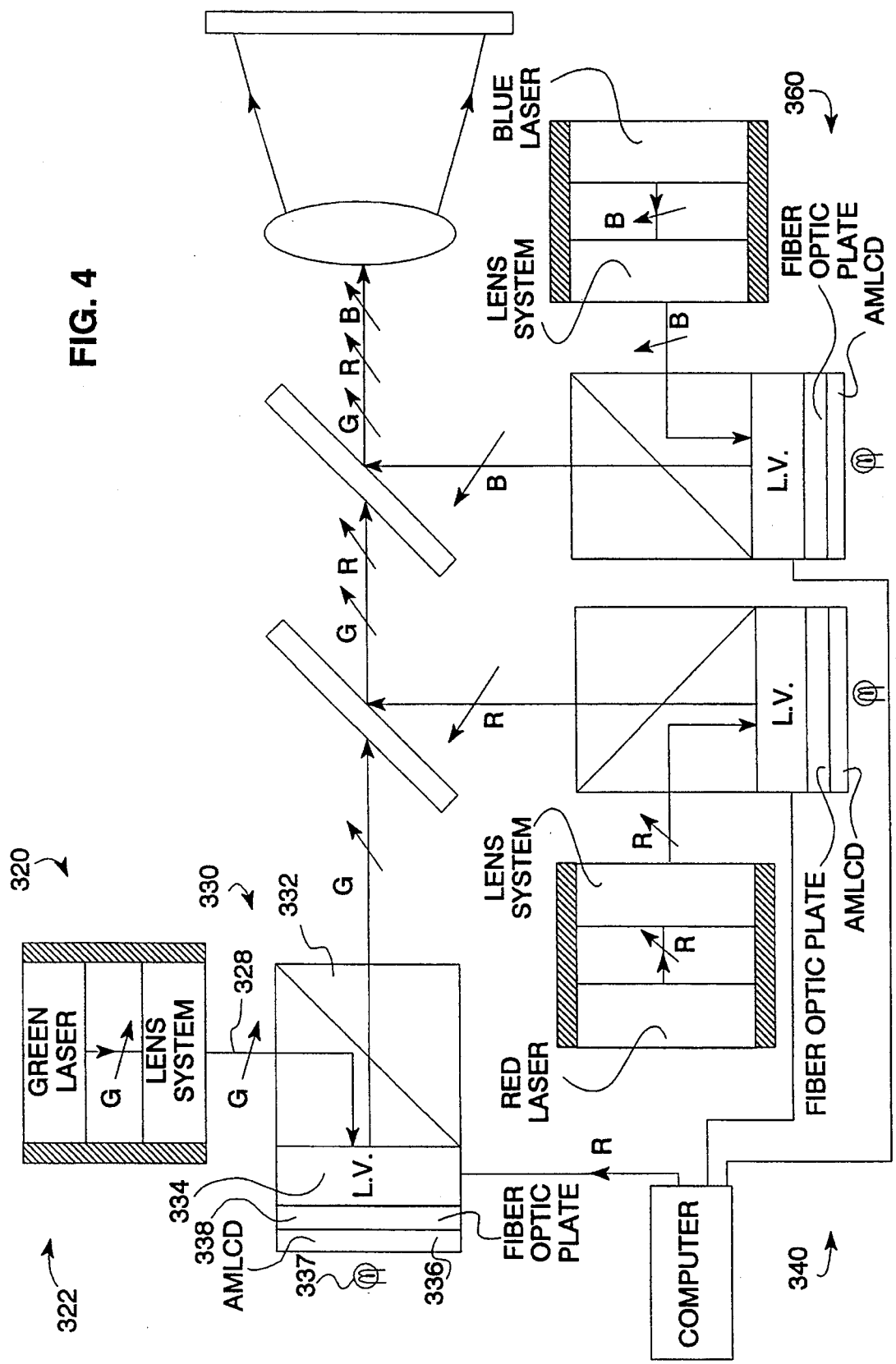
FIG. 4 is a block diagram of a further image projection system, which is also constructed in accordance with the present invention.

Referring now to FIG. 4 of the drawings, there is shown another image projection system 310, which is also constructed according to the present invention. The image projection system 310, and the method of using it, is substantially similar to the image projection system 210, except that a different writing light source is employed.

The system 310 includes a green projection apparatus 330, a red projection apparatus 340, and a blue projection apparatus 360, which are substantially similar to one another. Only the projection apparatus 320 will now be considered hereinafter in greater detail. The projection apparatus 320 includes a projection light source 322, which is substantially similar to the projection light source 222, and a spatial light modulator 330.

The spatial light modulator 330 includes a polarizing beam splitter 332 to redirect a projection light beam 328 onto a light valve 334, which is substantially similar to the light valve 234, thereby providing a "reading" light.

A "writing" light to form an image within the light valve 334 is provided by active matrix liquid crystal display (AMLCD) 336 and a light source 337. This "writing" light is optically transferred to the light valve 334 by the fiber optic plate 338, thereby facilitating the modulation of the light valve 334.

It is not required that the light source 337 be an extremely high intensity source as the light emanating therefrom is not used to project an image. Thus, the light source 337 may be an incandescent lamp or any other similar light source.

While the spatial light modulators 230 and 330 have been described as using a CRT 236 and an AMLCD 336, respectively, in conjunction with a photoelectric LCD, other "writing" devices may also be used. For example, a laser-scanned Smectic A liquid crystal valve may also be used.

Figure 5:
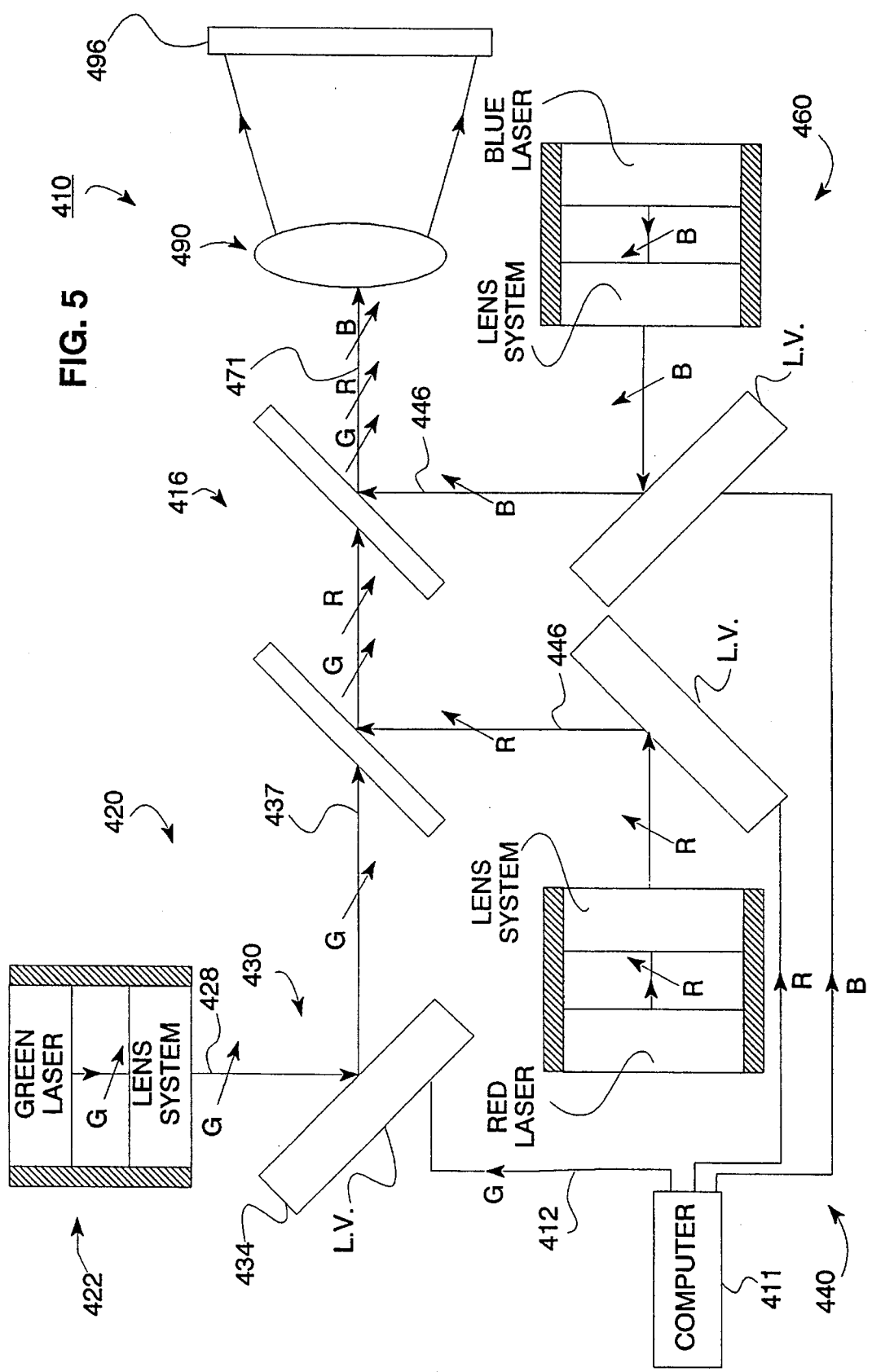
FIG. 5 is a block diagram of yet another image projection system, which is also constructed in accordance with the present invention.

Referring now to FIG. 5, there is shown another image projection system 410, which is also constructed according to the present invention.

The image protection system 410 includes a green projection apparatus 420, a red projection apparatus 440, and a blue projection apparatus 460. As the projection apparatus 420 is substantially similar to the apparatus 440 and to the apparatus 460, only the projection apparatus 420 will now be considered in greater detail. The projection apparatus 420 includes a projection light source 422 which is substantially similar to the projection light source 322, and a spatial light modulator 430.

The spatial light modulator 430 includes a light valve 434. Unlike the reflective light valves 234 and 334 which are beam addressed, the light valve 434 is not beam addressed, i.e., no "writing" light is used to manipulate the light valve. Instead, the light valve 434 is matrix, or digitally addressed. In this regard, a computer 411 is connected to the light valve 434 by a conductor 412 and controls the light valve device 434 for modulating a projection light beam 428 to generate an output light beam or image 437. Preferably, the light valve 434 is a digital mirror device.

In operation, the projection light source 422 produces the polarized projection light beam 428 and facilitates directing the polarized projection light beam 428 onto the light valve (digital mirror device) 434. The light valve 434 cooperates with the computer 411 to modulate and reflect the projection light beam 428, thereby generating the output light beam 437. The output light beam 437 then passes on to the mirror system 416 for thereafter combining with the other two colored light beams. It will be understood by one skilled in the art that the light valve device 434 is suitably positioned to permit the polarized projection light beam 428 to be reflected as the output light beam 437, wherein the output light beam 437 is directed toward the mirror system 416 and is superimposed on the other two colored light beams.

The mirror system 416 combines the output light beams 446 and 466 from the projection apparatus 440 and 460, respectively, to form the full color output light beam 471. The projection lens system 490 projects the full color output beam 471 onto a remote viewing surface 496, forming a bright full color image thereon.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An image projection system, comprising:

light source means for producing high intensity polarized projection light having a given polarization direction and directed along an input optical path, said light source means including a laser to selectively emit a polarized laser beam;

spatial light modulator means disposed in said input optical path for modulating said projection light to generate output light representative of the image along an output optical path, said spatial light modulator means including a light valve having an entrance alignment layer with a polarized direction aligned with said polarization direction;

means mounting said light source means in alignment with said entrance alignment layer for aligning said projection light polarization direction and said alignment layers polarized direction to permit substantially all of said projection light to pass through said alignment layer;

projection lens means disposed in said output optical path for projecting said output light to reproduce the image onto a viewing surface;

wherein said spatial light modulator means further includes an optical lens for focusing said polarized laser beam to produce said projection light;

wherein said projection light produced by said optical lens forms a projection light beam having a cross-sectional area substantially equal to the surface area of said light valve alignment layer;

wherein said light valve is reflective;

wherein said light source means further includes a plurality of said lasers, each one of said lasers selectively emits a polarized laser beam having a distinctive color and a common polarization direction to generate a colored output light;

wherein said spatial light modulating means further includes a plurality of said light valves;

a mirror means for superimposing said colored output lights to produce a full color image; and wherein said light valve is a digital mirror device.

2. An Image projection system according to claim 1, wherein said surface area has rectangular dimensions of about three inches by about three inches.

3. An image projection system according to claim 1, wherein said surface area has rectangular dimensions of about two inches by about two inches.

4. An Image projection system according to claim 1, wherein said surface area has rectangular dimensions of about one inch by about one inch.

5. An image projection system according to claim 1, wherein the number of said light valves substantially corresponds to the number of said lasers, wherein each of said light valves cooperates with a corresponding laser to generate colored output light representative of the image.

6. An image projection system according to claim 1, wherein said plurality of lasers includes a red laser, a green laser, and a blue laser.

7. An image projection system according to claim 1, wherein said mirror means includes a plurality of dichroic mirrors.

8. A method for projecting an image, comprising:

using a light source means for producing polarized projection light having a polarization direction along an input optical path, said light source means including a plurality of lasers;

using spatial light modulator means disposed in said input optical path for modulating said projection light to generate an output light representative of the image along an output optical path, said spatial light modulator means including a light valve having an entrance alignment layer with a polarized filter characteristic to filter optically said projection light, said spatial light modulating means further including a plurality of said light valves;

aligning said light source means with said entrance alignment layer for enabling said projection light polarization direction to be substantially aligned with said alignment layer polarized direction to permit substantially all of said projection light to pass through said alignment layer;

projecting said output light with projection lens means disposed in said output optical path to reproduce the image on a viewing surface;

focusing said polarized laser beam with an optical lens to produce said projection light;

wherein said projection light produced by said optical lens forms a projection light having a cross-sectional area substantially equal to the surface area of said entrance alignment layer;

reflecting selectively said projection light with said light valve to help generate said output light indicative of the image, wherein said light valve is a digital mirror device;

positioning said digital mirror device relative to said light source to permit said projection light to be reflected as said output light;

emitting selectively a polarized laser beam having a distinctive color from each one of said lasers to generate a colored output light; and superimposing said colored output lights with a mirror means to produce a full color image.

9. An image projection system, comprising:

light source means for producing high intensity polarized projection light having a given polarization direction and directed along an input optical path, said light source means including a laser to selectively emit a polarized laser beam;

transmissive spatial light modulator means disposed in said input optical path for modulating said projection light to generate output light representative of the image along an output optical path, said spatial light modulator means including a light valve having an entrance alignment layer with a polarized direction and an exit alignment layer;

means for mounting said light source means in alignment with said entrance alignment layer to align said projection light polarization direction and said entrance alignment layer polarized direction for permitting substantially all of said projection light to pass through said entrance alignment layer;

wherein said laser beam travels unreflected and one way along said input optical path into and transmissively through said entrance alignment layer and said exit alignment layer;

whereby said modulated projection light exits said light valve through said exit alignment layer as said output light;

projection lens means disposed in said output optical path for projecting said output light to reproduce the image onto a viewing surface; and said spatial light modulator means further including an optical lens for focusing said laser beam to produce said projection light, wherein substantially all of said laser beam passes through said light valve to help project the image onto said surface.

10. An image projection system according to claim 9, wherein said projection light produced by said optical lens forms a projection light beam having a cross-sectional area substantially equal to the surface area of said light valve entrance alignment layer.

11. An image projection system according to claim 9, wherein said light source means further includes a plurality of said lasers, each of said lasers selectively emits a polarized laser beam having a distinctive color and a common polarization direction.

12. An image projection system according to claim 11, wherein said spatial light modulating means further includes a plurality of said light valves.

13. An image projection system according to claim 12, wherein the number of said light valves substantially corresponds to the number of said lasers, wherein each of said light valves cooperates with a corresponding laser to generate colored output light representative of the image.

14. An image projection system according to claim 12, wherein said spatial light modulator further includes a plurality of said optical lenses for focusing said polarized laser beams to produce said projection light.

15. An image projection system according to claim 11, wherein said plurality of lasers includes a red laser, a green laser, and a blue laser.

16. An image projection system according to claim 12, further including a mirror means for superimposing said colored output lights to produce a full color image.

17. An image projection system according to claim 16, wherein said mirror means includes a plurality of dichroic mirrors.

18. An image projection system according to claim 10, wherein said surface area has rectangular dimensions of about three inches by about three inches.

19. An Image projection system according to claim 10, wherein said surface area has rectangular dimensions of about two inches by about two inches.

20. An image projection system according to claim 10, wherein said surface area has rectangular dimensions of about one inch by about one inch.

* * * * *

UNITED STATES PATENT AND TRADEMARK OFFICE
CERTIFICATE OF CORRECTION

PATENT NO. : 5,517,263
DATED : May 14, 1996
INVENTOR(S) : Arthur P. Minich, et al.

It is certified that error appears in the above-indentified patent and that said Letters Patent is hereby corrected as shown below:

Column 12, line 6, delete "Image" and substitute therefor --image--.

Column 12, line 52, after "light", insert --beam--.

Column 12, line 12, delete "Image" and substitute therefor --image--.

Column 14, line 32, delete "Image", and substitute therefor --image--.

Signed and Sealed this

Eighth Day of July, 1997

Attest:

BRUCE LEHMAN

*Attesting Officer*    *Commissioner of Patents and Trademarks*